Dec. 13, 1955  F. E. BILLOCK ET AL  2,726,795
REFRIGERATOR TYPE MILK CONTAINER AND DISPENSER
Filed May 21, 1953
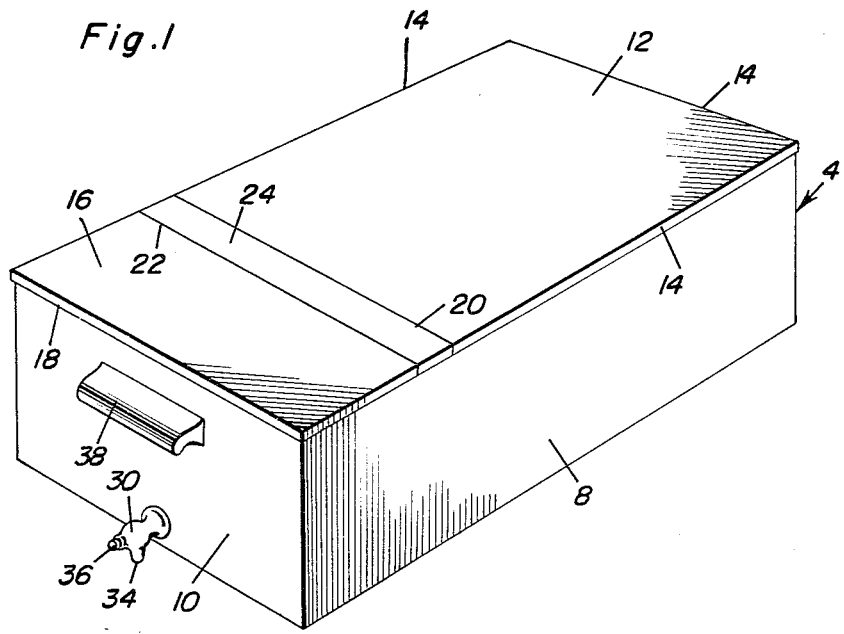
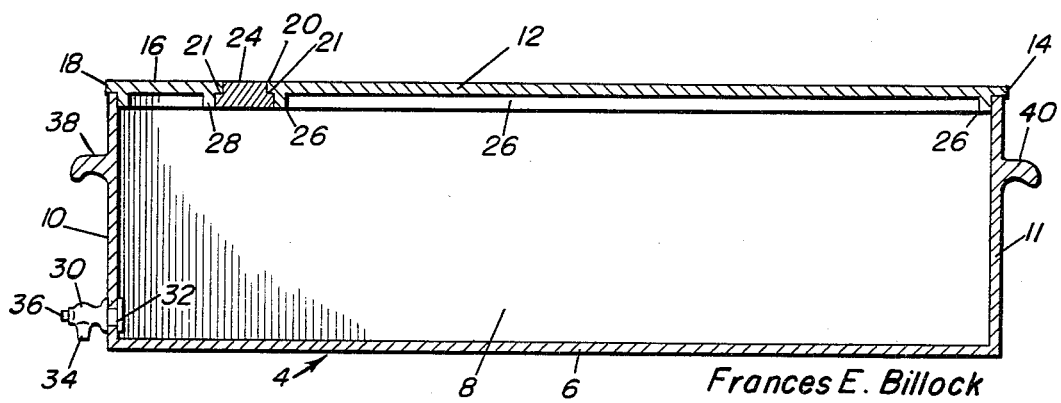
Frances E. Billock
Thomas L. Billock
INVENTORS

United States Patent Office 2,726,795
Patented Dec. 13, 1955

2,726,795

REFRIGERATOR TYPE MILK CONTAINER AND DISPENSER

Frances E. Eillock and Thomas L. Billock, Leavittsburg, Ohio

Application May 21, 1953, Serial No. 356,474

1 Claim. (Cl. 222—466)

The present invention relates to a special utility container which is expressly and, therefore, suitably constructed and designed for use in the usual shelved compartment of home refrigerators, especially the electromechanical and equivalent types.

More specifically, the invention appertains to a fairly large but durable and light weight handle-equipped and valve-equipped box which is primarily adapted to function as a milk container and dispenser. It is a matter of common knowledge, it is believed, that the average home owner uses a medium sized refrigerator wherein storage facilities are not such as to accommodate too many quart sized milk bottles. On the other hand, it is well known that in the household where there are a number of children and milk drinkers, the housewife buys perhaps as much as a gallon or more of milk, and usually the refrigerator is not built to accommodate gallon jugs, or half gallon jars, or even four or more quart bottles.

It is also generally well known that milk bottles usually have to be wiped clean before placing in the ice box, and when one bottle is opened and only a glass or two of milk is emptied therefrom, it is necessary again to wipe off the bottle and the mouth of the bottle, and perhaps, the cap before putting it back in the box. This handling of many milk bottles by the housewife is not only messy but is generally time-consuming and perplexing, to say the least. There has, therefore, long existed a need for more convenient storage of a large quantity of milk, a gallon or more, in the refrigerator. There also exists the need that such a storage container should be so constructed as to permit the milk to be drawn directly therefrom by way of a pet cock or handily located dispensing valve. It is therefore the object of the present invention to provide a simple, economical and practical refrigerator type milk container and dispenser which may be placed in an available space thereof on one of the shelves and which has a flat, firm resting bottom for contact with the shelf and also preferably has a flat top which, if desired, may be used, within reason, as an extra shelf for supporting other food products which could not handily be placed on the main shelf were it loaded with four or five quart milk bottles.

The object of this invention is, therefore, to overcome the difficulties touched upon, and to do so through the medium of a simple, economical and sanitary type milk container and dispenser in which manufacturers, dairymen and users in general, will find their respective requirements and needs adequately and satisfactorily met.

In carrying out a preferred embodiment of the invention, a milk storage and handy dispenser is provided which is characterized by a flat bottomed container for a gallon, more or less, of milk, said container being wholly transparent so that the amount of milk contained therein will be clearly visible at all times and being suitable to rest firmly and slidingly on a refrigerator shelf so that it may be slid out part way or bodily and wholly removed for cleaning and replenishing from time to time, said container having front and rear walls provided with fixed easy-to-grasp hand-grips, and a spigot mounted in said front wall adjacent said bottom.

Further novelty is predicated on a container which takes the form of a substantially rectangular box, all the walls of which are flat, the flat top wall being susceptible of use as an extra shelf, and said top wall being made up of attachable and detachable sections, one large and one small, and said sections providing selectively usable lids and paving the way for handy filling of the box by way of the small lid when removed, and complete cleansing of the entire box just as soon as the supply of milk therein has been consumed.

Other objects, features and advantages will become more readily apparent from the following description and the accompanying sheet of drawings.

In the accompanying drawings, wherein like numerals are employed to designate like parts throughout the views:

Figure 1 is a perspective view of a refrigerator type milk container and dispenser constructed in accordance with the principles of the present invention; and Figure 2 is a central longitudinal sectional view through the same.

Referring now to the drawings by reference numerals and accompanying lead lines, it will be seen, as before mentioned, that the so-called container is specifically in the form of a rectangular box having a receptacle portion and cover or lid portion. The entire assembly is denoted by the numeral 4. The receptacle portion comprises a flat bottom wall 6, upstanding spaced parallel longitudinal or side walls 8—8, and transverse front and rear end walls 10 and 11. The top wall is here sectional, and also functions as the lidding or cover means for the otherwise open top. This top wall comprises a main flat faced cover section 12 whose marginal edges 14 rest atop the upper edges of the side and rear end walls, in the manner shown. The marginal edges of the smaller auxiliary cover section 16, that is, the edges denoted at 18, rest on the complemental upper edges of the side walls 8 and front end wall 10, as shown best in Figure 2. The adjacent edges of the respective sections, which are denoted by the numerals 20 and 22, rest on ledges provided therefor on a so-called transverse parting strip or member 24. This spans the open top and has its ends integral with the side walls and the longitudinal upper edge portions are formed with grooves or rabbets which define the ledges and the edges 20 and 22 rest thereon in mating relationship, as shown in Figure 2. On the underside of the cover sections are provided depending marginal flanges which are disposed inwardly of the marginal edges and which are denoted by the numerals 26 and 28, respectively, and these flanges telescope into and frictionally engage the cooperating surfaces, chiefly, the inner surfaces of the walls 8—8, 10 and 11. The main cover section remains normally in place, while the smaller cover section, which is generally some 4 inches in width, is removed for replenishing or filling the storage space of the box from time to time.

The valve means, generally speaking, takes the form of a pet cock 30, and this is communicatively mounted, as at 32, in the front wall adjacent the bottom, as shown in Figure 2, and the discharge portion thereof at 34 is directed in a vertical position where it is handy for dispensing milk into a drinking glass, bowl or the like. This is a push-button type pet cock and the button is denoted at 36, where it is handy for practical usefulness. The broad horizontal hand-grips are denoted by the numerals 38 and 40, and they are attached to the front and rear walls and are located adjacent the upper edge portions of said walls where they are properly balanced for handling the loaded box or container. It may be said that this push-button pet cock is proper in a device of this kind because it enables the box to be slid out on the refrigerator shelf, if desired, where the glass or other receptacle may be placed therebeneath for filling without spilling.

One of the main things is that the container is preferably constructed of glass or commercial plastics or some transparent material so that the contents of the glass or container will be visible at all times. It is felt, therefore, that the subject matter herein revealed has to do with a novel contribution to the art which simplifies the household duties of all concerned. It is, indeed, thought to be an innovation as a special dispensing container for refrigerators.

From the foregoing, the construction and operation of the device will be readily understood and further explanation is believed to be unnecessary. However, since numerous modifications and equivalents will readily occur to those skilled in the art, it is not desired to limit the invention to the exact construction shown and described, and accordingly, all suitable modifications and equivalents may be resorted to, falling within the scope of the appended claim.

What is claimed as new is as follows:

For use in the usual shelved storage compartment of a home refrigerator, a one gallon capacity rectangular milk storage and dispensing container in the form of a box having flat bottom, top, side and front and rear end walls, all of transparent material, said top wall embodying a relatively large rearward main section and a complemental small auxiliary forward section, said sections providing selectively usable lids having their principal marginal edges resting atop the respective side walls and front and rear walls, said sections having depending marginal flanges fitting telescopically into the milk space and frictionally contacting the interior surfaces of said side, front and rear walls, exteriorly disposed horizontally elongated hand-grips joined to upper portions of said front and rear end walls, a push-button pet cock communicatively joined to said front wall adjacent said bottom wall for dispensing milk into a drinking glass or similar receptacle, and a transverse parting strip located between the forward end of the main section and rearward end of the auxiliary section, said strip being integral at its respective ends with the upper edge portions of said side walls, having its top flush with the top surfaces of said sections and its longitudinal edges rabbeted and defining support ledges for adjacent cooperating overlapping edges of said main and auxiliary sections.

References Cited in the file of this patent

UNITED STATES PATENTS

| | | |
|---|---|---|
| 254,120 | Darcy | Feb. 28, 1882 |
| 983,058 | Jackson | Jan. 31, 1911 |
| 1,490,598 | Davis | Apr. 15, 1924 |
| 1,641,335 | Johnson | Sept. 6, 1927 |
| 1,887,125 | Green | Nov. 8, 1932 |
| 2,027,092 | Dowell | Jan. 7, 1936 |
| 2,199,195 | Crimmel | Apr. 30, 1940 |